Figure 1:
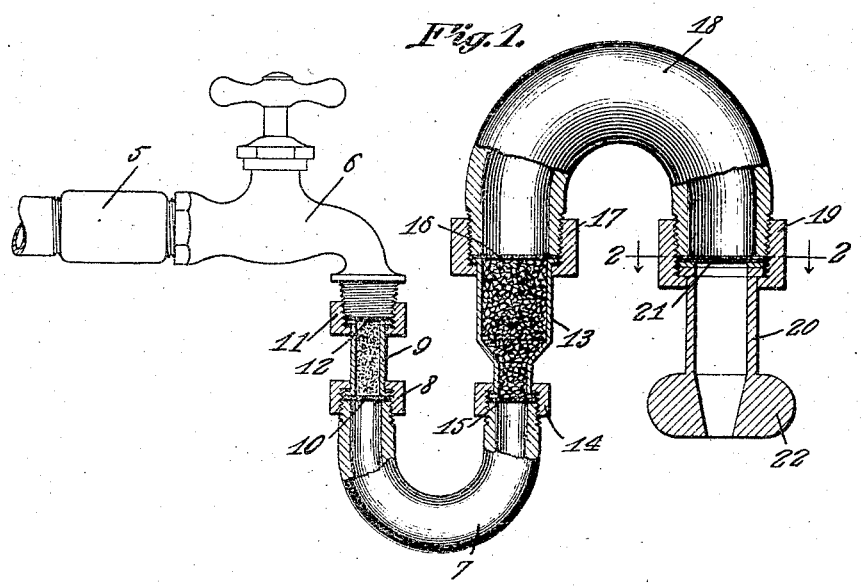

C. V. RORER.
LIQUID FILTER.
APPLICATION FILED FEB. 24, 1917.

1,287,755. Patented Dec. 17, 1918.

Charles V. Rorer, INVENTOR

WITNESSES
John M. Dobie

BY Richard B. Owen.

ATTORNEY

UNITED STATES PATENT OFFICE.

CHARLES VICTOR RORER, OF BRIDGEPORT, CONNECTICUT.

LIQUID-FILTER.

1,287,755. Specification of Letters Patent. Patented Dec. 17, 1918.

Application filed February 24, 1917. Serial No. 150,756.

*To all whom it may concern:*

Be it known that I, CHARLES V. RORER, a citizen of the United States, residing at Bridgeport, in the county of Fairfield and State of Connecticut, have invented certain new and useful Improvements in Liquid-Filters, of which the following is a specification.

My invention relates to liquid filters, and more particularly to a filter for filtering water.

The primary object of the present invention is to provide a water filter for use in places such as small towns which are not equipped with a filtration plant.

A second object of the present invention is to provide a filter which may be attached to any water supply.

A further object is to provide a filtering device of the above mentioned type which may be quickly and easily attached and detached from the conventional water supply pipe.

An additional object is to provide a filtering device which consists of few operating parts, is inexpensive to manufacture, and thereby will enable the manufacturer to place them on the market at a minimum cost.

The inventive idea embodies a practical arrangement of coacting parts and novel arrangement which will be hereinafter set forth in detail and explicitly defined in the appended claims.

Figure 2:
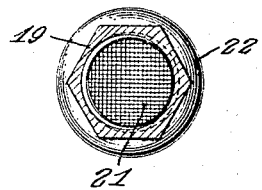

On the drawing:

Figure 1 is a view of a conventional spigot having my improved filter applied thereto, parts of the filter being shown in section, and Fig. 2 is a transverse sectional view on the line 2—2 of Fig. 1.

Referring to the drawing in which like characters of reference indicate like parts, the numeral 5 designates a water pipe which leads to the dwelling or other place and which has mounted therein the usual spigot 6 which controls the water supply.

My improved filter embodies a U-shaped pipe 7 having its extremities threaded, and in one end of this U-shaped pipe 7 is a coupling nut 8 in which is engaged the flanged ends of a relatively short tube or container 9. Interposed between this flanged end of the container 9 and the upper face of the threaded end of the pipe 7 is a reticulated disk 10 of very fine mesh. The upper end of this tube or container 9 is flanged and carries a second threaded coupling nut 11 and also carries a reticulated disk 12, which threaded coupling is threaded upon the threaded nozzle of the spigot 6. Any suitable filtering material is arranged in this container 9 such as sand, gravel, etc.

The numeral 13 designates a relatively large charcoal or other carbonaceous substance retaining receptacle having its lower end thereby reduced and engaged with the threaded nut 14 which is engaged upon the other extremity of the pipe 7, which pipe and contracted end has interposed therebetween a reticulated disk 15. The upper end of this receptacle 13 is flanged and supports a filtering disk 16. This flange is engaged with a relatively large coupling nut 17 that in turn is threaded upon one extremity of an inverted U-shaped pipe 18, the opposite end of which is threaded. Threaded on this end of the inverted U-shaped pipe 18 is a coupling nut 19 which is engaged with the flanged end of an outlet nozzle 20. This flanged end has suitable packing rings thereon which bears against the filtering disk 21. The lower end of this outlet nozzle is provided with a rounded enlargement 22 which is provided with a contracted bore.

From the above it will be seen that when the valve 6 is opened the water will flow through the sand or gravel contained in the chamber 9 and thence flow through the pipe 7 and through the charcoal or other carbonaceous substance and thence through the pipe 18 and thence out by way of the nozzle 20.

While the above form is considered to be the preferred embodiment of the invention, it is to be understood that the invention may be modified and altered in many different respects, that may fall within the appended claims.

What is claimed is:

1. In a filter, a water supply valve, a filtering material containing chamber having detachable engagement therewith, a U-shaped pipe having one end connected with the chamber, a second filtering material containing chamber having detachable engagement with the other extremity of the U-shaped pipe, an inverted U-shaped pipe having one end detachably engaged with the second filtering material containing chamber, and a nozzle connected with the opposite extremity of the inverted U-shaped pipe.

2. A filter including in combination with a faucet, a filtering material container removably connected with said faucet, a U-shaped tube having one end thereof removably connected with said container, a second container removably connected with the opposite end of said U-shaped tube, a second inverted U-shaped tube having one of its ends removably connected to said second container, and a nozzle removably connected with the remaining end of said inverted tube.

3. A filter including a pair of oppositely arranged U-shaped tubes, a filtering material container connecting said tubes together at one end, a second similar container removably secured to the opposite end of one of said tubes, and a nozzle secured to the opposite end of the other tube.

4. A filter including a pair of oppositely arranged U-shaped tubes, a filtering material container, connecting said tubes at one end, said container being provided at its respective ends with outwardly extending flanges, reticulated disks positioned between said flanges and the adjacent ends of the tube to retain the filtering material within the container, coupling nuts carried by said container to secure the flanged ends thereof to the adjacent ends of said tubes, a nozzle carried by the free end of one of said tubes, and means carried by the free end of the other tube to connect the same to a source of liquid supply.

5. In a filter, the combination with a faucet of a filtering material container having flanged ends, reticulated disks engaged with said flanged ends to retain the filtering material within the container, a coupling nut securing one of said flanged ends to the faucet, a U-shaped tube, a second coupling nut securing the remaining flanged end of the container to one end of said tube, a second container removably connected with the opposite end of said tube, a second inverted U-shaped tube having one of its ends removably connected with said second container, and a nozzle carried by the opposite end of said inverted tube.

In testimony whereof I affix my signature in presence of two witnesses.

CHARLES VICTOR RORER.

Witnesses:
EDWARD J. SWEENEY,
LOUIS L. FRANCOIS.

Copies of this patent may be obtained for five cents each, by addressing the "Commissioner of Patents, Washington, D. C."